（12） United States Patent
Shen et al.

(10) Patent No.: US 11,625,352 B2
(45) Date of Patent: Apr. 11, 2023

(54) DRAM COMMAND STREAK MANAGEMENT (71) Applicant: Advanced Micro Devices, Inc., Santa Clara, CA (US)

(72) Inventors: Guanhao Shen, Austin, TX (US); Ravindra Nath Bhargava, Austin, TX (US); Raghava Sravan Adidamu, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 175 days.

(21) Appl. No.: 16/900,632

(22) Filed: Jun. 12, 2020

(65) Prior Publication Data

US 2021/0390071 A1 Dec. 16, 2021

(51) Int. Cl.
*G06F 13/40* (2006.01)
(52) U.S. Cl.
CPC ................................ *G06F 13/4031* (2013.01)
(58) Field of Classification Search
CPC ........ G06F 13/4031; G06F 13/16; G06F 3/06; G11C 11/408; G11C 11/4096
See application file for complete search history.

(56) References Cited

U.S. PATENT DOCUMENTS

| 7,194,561 | B2 * | 3/2007 | Weber ................... G06F 13/161 |
| | | | 710/316 |
| 10,402,120 | B2 | 9/2019 | Balakrishnan |
| 2007/0220361 | A1 | 9/2007 | Barnum et al. |
| 2007/0294470 | A1 | 12/2007 | Van Dyke et al. |
| 2010/0011141 | A1 * | 1/2010 | Shen ....................... G06F 13/28 |
| | | | 710/113 |
| 2014/0074880 | A1 | 3/2014 | Karamcheti et al. |
| 2014/0201471 | A1 | 7/2014 | Cutter et al. |
| 2014/0310486 | A1 | 10/2014 | Goodman et al. |
| 2014/0372711 | A1 | 12/2014 | O'Connor et al. |
| 2017/0352403 | A1 | 12/2017 | Lee et al. |
| 2018/0018133 | A1 * | 1/2018 | Balakrishnan ........ G06F 3/0659 |
| 2018/0018291 | A1 * | 1/2018 | Magro ................ G06F 13/4068 |

(Continued)

FOREIGN PATENT DOCUMENTS

KR 10-2017-013638 A 12/2017

OTHER PUBLICATIONS

International Search Report and Written Opinion for International Application No. PCT/US2021/034072, dated Sep. 17, 2021, 7 pages.

*Primary Examiner* — Phong H Dang
(74) *Attorney, Agent, or Firm* — Polansky & Associates, P.L.L.C.; Paul J. Polansky; Nathan H. Calvert (57) ABSTRACT

A memory controller includes a command queue and an arbiter for selecting entries from the command queue for transmission to a DRAM. The arbiter transacts streaks of consecutive read commands and streaks of consecutive write commands. The arbiter has a current mode indicating the type of commands currently being transacted, and a cross mode indicating the other type. The arbiter is operable to monitor commands in the command queue for the current mode and the cross mode, and in response to designated conditions, send at least one cross-mode command to the memory interface queue while continuing to operate in the current mode. In response to an end streak condition, the arbiter swaps the current mode and the cross mode, and transacts the cross-mode command.

25 Claims, 7 Drawing Sheets

(56) References Cited

U.S. PATENT DOCUMENTS

| | | | | |
|---|---|---|---|---|
| 2019/0196996 A1* | 6/2019 | Balakrishnan | .......... | G06F 13/30 |
| 2019/0303039 A1* | 10/2019 | Teh | ................ | G06F 3/0604 |
| 2019/0369917 A1* | 12/2019 | Jin | ................ | G06F 13/1626 |
| 2021/0357336 A1* | 11/2021 | Shen | ................ | G06F 13/1668 |

* cited by examiner

DRAM COMMAND STREAK MANAGEMENT

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs use conventional DRAM memory cell arrays with high-speed access circuits to achieve high transfer rates and to improve the utilization of the memory bus.

A typical DDR memory controller maintains a queue to store pending read and write requests to allow the memory controller to pick the pending requests out of order and thereby to increase efficiency. For example, the memory controller can retrieve multiple memory access requests to the same row in a given rank of memory (referred to as "page hits") from the queue out of order and issue them consecutively to the memory system to avoid the overhead of precharging the current row and activating another row repeatedly. However, scanning and picking accesses from a deep queue while taking advantage of the bus bandwidth available with modern memory technologies such as DDR5 has become difficult to achieve with known memory controllers. Memory controllers may employ techniques such as creating streaks of read commands or write commands to improve bus efficiency. However, such techniques come with performance trade-offs, such as latency concerns that arise from delaying commands not part of the current streak, and additional performance overhead associated with "turning around" the command bus from a read streak to a write streak, and vice versa.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes a command queue having a first input for receiving memory access requests, and a memory interface queue having an output for coupling to a memory channel adapted for connecting to at least one dynamic random access memory (DRAM). An arbiter is connected to the command queue for selecting entries from the command queue, and placing them in the memory interface queue causing them to be transmitted over the memory channel. The arbiter is operable to transact streaks of consecutive read commands and streaks of consecutive write commands over the memory channel. The arbiter has a current mode indicating the type of commands currently being transacted, and a cross mode indicating the other type. The arbiter is operable to monitor commands in the command queue for the current mode and the cross mode, and in response to designated conditions including an absence of available current mode activate (ACT) commands, send one available cross-mode ACT command to the memory interface queue for a cross-mode command while continuing to operate in the current mode. In response to an end streak condition, the arbiter swaps the current mode and the cross mode, and transacts the cross-mode command.

A method includes receiving a plurality of memory access requests including memory reads and memory writes, selectively placing memory access commands for fulfilling the memory access requests in a memory interface queue, and transmitting the memory access commands from the memory interface queue to a memory channel coupled to at least one dynamic random access memory (DRAM). The method causes streaks of consecutive read commands and streaks of consecutive write commands to be transacted over the memory channel, the streaks based on a current mode indicating the type of commands currently being transacted, wherein the type indicates one or read or write, and a cross mode comprising the other type. The method monitors available commands for the current mode and the cross mode. In response to designated conditions including an absence of available current mode activate (ACT) commands, the method sends an available cross-mode ACT command for a cross-mode command to the memory interface queue while continuing to operate in the current mode. In response to an end streak condition, the method swaps the current mode and the cross mode, and transacts the cross-mode command.

A data processing system includes a central processing unit, a data fabric coupled to the central processing unit, a memory controller coupled to the data fabric for fulfilling memory requests from the central processing unit. The memory controller a command queue having a first input for receiving memory access requests, and a memory interface queue having an output for coupling to a memory channel adapted for connecting to at least one dynamic random access memory (DRAM). An arbiter is connected to the command queue for selecting entries from the command queue, and placing them in the memory interface queue causing them to be transmitted over the memory channel. The arbiter is operable to transact streaks of consecutive read commands and streaks of consecutive write commands over the memory channel. The arbiter has a current mode indicating the type of commands currently being transacted, and a cross mode indicating the other type. The arbiter is operable to monitor commands in the command queue for the current mode and the cross mode, and in response to designated conditions including an absence of available current mode activate (ACT) commands, send an available cross mode ACT command to the memory interface queue for a cross-mode command while continuing to operate in the current mode. In response to an end streak condition, the arbiter swaps the current mode and the cross mode, and transacts the cross-mode command.

A memory controller includes a command queue having a first input for receiving memory access requests, and a memory interface queue having an output for coupling to a memory channel adapted for connecting to at least one dynamic random access memory (DRAM). An arbiter is connected to the command queue for selecting entries from the command queue, and placing them in the memory interface queue causing them to be transmitted over the memory channel. The arbiter is operable to transact streaks of consecutive read commands and streaks of consecutive write commands over the memory channel. The arbiter has a current mode indicating the type of commands currently being transacted, and a cross mode indicating the other type. The arbiter is operable to monitor commands in the command queue for the current mode and the cross mode, and in response to designated conditions including a designated minimum threshold of cross mode commands being available at the arbiter, send an available cross mode ACT command for a cross-mode command to the memory interface queue while continuing to operate in the current mode. In response to an end streak condition, the arbiter swaps the current mode and the cross mode, and transacts the cross-mode command.

Figure 1:
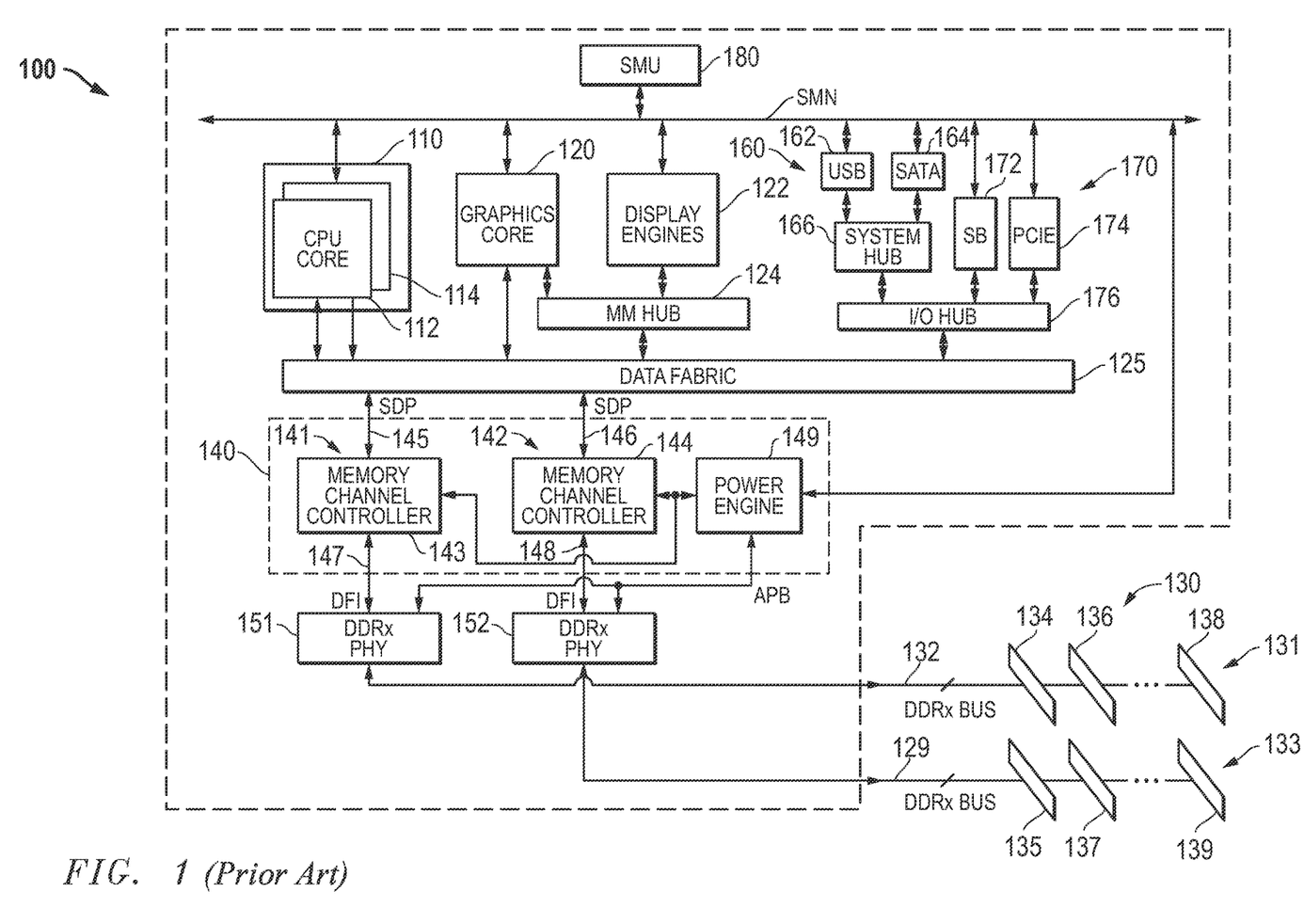
FIG. 1 illustrates in block diagram form an accelerated processing unit (APU) and memory system known in the prior art.

FIG. 1 illustrates in block diagram form an accelerated processing unit (APU) 100 and memory system 130 known in the prior art. APU 100 is an integrated circuit suitable for use as a processor in a host data processing system, and includes generally a central processing unit (CPU) core complex 110, a graphics core 120, a set of display engines 122, a memory management hub 140, a data fabric 125, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 140 for uniform translation into appropriate addresses in memory system 130, and memory management hub 140 is bidirectionally connected to data fabric 125 for generating such memory accesses and receiving read data returned from the memory system.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory management hub 140 and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and in the exemplary embodiment conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the APB, and is also bidirectionally connected to memory channel controllers 143 and 144. PHY 151 has a bidirectional connection to memory channel 131. PHY 152 has a bidirectional connection memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
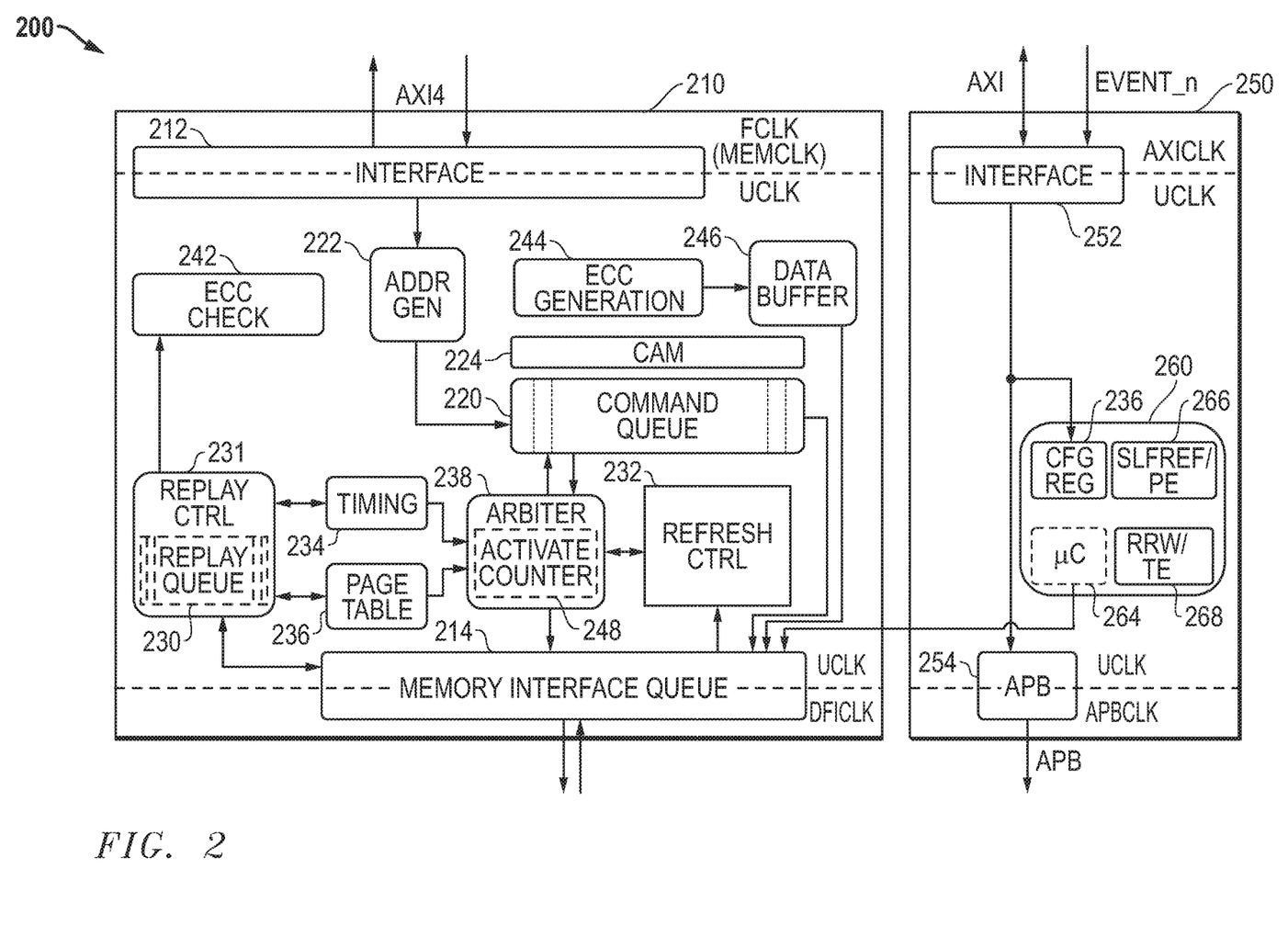
FIG. 2 illustrates in block diagram form a memory controller suitable for use in an APU like that of FIG. 1 according to some embodiments.

FIG. 2 illustrates in block diagram form a memory controller 200 that is suitable for use in an APU like that of FIG. 1. Memory controller 200 includes generally a memory channel controller 210 and a power controller 250. Memory channel controller 210 includes generally an interface 212, a memory interface queue 214, a command queue 220, an address generator 222, a content addressable memory (CAM) 224, replay control logic 231 including a replay queue 230, a refresh control logic block 232, a timing block 234, a page table 236, an arbiter 238, an error correction code (ECC) check circuit 242, an ECC generation block 244, a data buffer 246, and refresh logic 247.

Interface 212 has a first bidirectional connection to data fabric 125 over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from data fabric 125 over the AXI4 bus. The memory access requests include access addresses in the physical address space represented in a normalized format. Address generator 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules.

Error correction code (ECC) generation block 244 determines the ECC of write data to be sent to the memory. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. Refresh control logic 232 includes an activate counter 248, which in this embodiment has a counter for each memory region which counts a rolling number of activate commands sent over the memory channel to a memory region. The memory regions are memory banks in some embodiments, and memory sub-banks in other embodiments as further discussed below. In addition, refresh control logic 232 periodically calibrates ZQ to prevent mismatch in on-die termination resistance due to thermal changes in the system.

Arbiter 238 is bidirectionally connected to command queue 220 and is the heart of memory channel controller 210, and improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Power controller 250 generally includes an interface 252 to an advanced extensible interface, version one (AXI), an advanced peripheral bus (APB) interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (μC) 264, a self refresh controller (SLFREF/PE) 266, and a reliable read/write timing engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. Self refresh controller 266 is an engine that allows the manual generation of refreshes in addition to the automatic generation of refreshes by refresh control logic 232. Reliable read/write timing engine 268 provides a continuous memory access stream to memory or I/O devices for such purposes as DDR interface maximum read latency (MRL) training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page. Arbiter 238, in some embodiments, determines eligibility for command selection based on at least on respective values of activate counter 248 for target memory regions of the respective commands.

Figure 3:
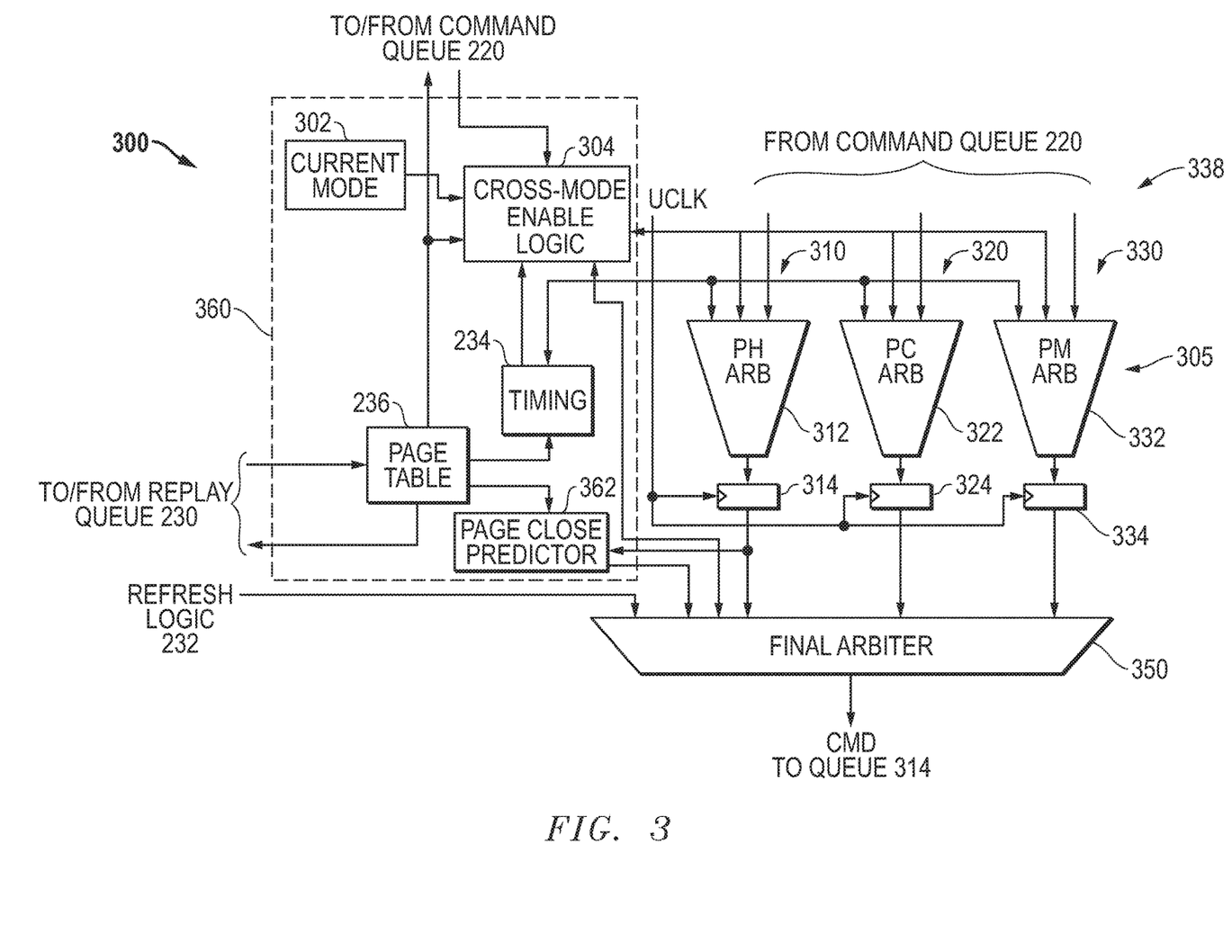
FIG. 3 illustrates a block diagram of a portion of the memory controller of FIG. 2 according to some embodiments.

FIG. 3 illustrates a block diagram of a portion 300 of memory controller 200 of FIG. 2 according to some embodiments. Portion 300 includes arbiter 238 and a set of control circuits 360 associated with the operation of arbiter 238. Arbiter 238 includes a set of sub-arbiters 305 and a final arbiter 350. Sub-arbiters 305 include a sub-arbiter 310, a sub-arbiter 320, and a sub-arbiter 330. Sub-arbiter 310 includes a page hit arbiter 312 labeled "PH ARB", and an output register 314. Page hit arbiter 312 has a first input connected to command queue 220, a second input, and an output. Register 314 has a data input connected to the output of page hit arbiter 312, a clock input for receiving the UCLK signal, and an output. Sub-arbiter 320 includes a page conflict arbiter 322 labeled "PC ARB", and an output register 324. Page conflict arbiter 322 has a first input connected to command queue 220, a second input, and an output. Register 324 has a data input connected to the output of page conflict arbiter 322, a clock input for receiving the UCLK signal, and an output. Sub-arbiter 330 includes a page miss arbiter 332 labeled "PM ARB", and an output register 334. Page miss arbiter 332 has a first input connected to command queue 220, a second input, and an output. Register 334 has a data input connected to the output of page miss arbiter 332, a clock input for receiving the UCLK signal, and an output. Final arbiter 350 has a first input connected to the output of refresh control logic 232, a second input from a page close predictor 362, a third input connected to the output of output register 314, a fourth input connected to the output of output register 324, a fifth input connected to the output of output register 334, a first output for providing a first arbitration winner to queue 214 labeled "CMD1", and a second output for providing a second arbitration winner to queue 214 labeled "CMD2".

Control circuits 360 include timing block 234 and page table 236 as previously described with respect to FIG. 2, and a page close predictor 362, a current mode register 302, and cross-mode enable logic 304. Timing block 234 has an output connected to cross-mode enable logic 304, an input and an output connected to page hit arbiter 312, page conflict arbiter 322, and page miss arbiter 332. Page table 234 has an input connected to an output of replay queue 230, an output connected to an input of replay queue 230, an output connected to the input of command queue 220, an output connected to the input of timing block 234, and an output connected to the input of page close predictor 362. Page close predictor 362 has an input connected to one output of page table 236, an input connected to the output of output register 314, and an output connected to the second input of final arbiter 350. Cross-mode enable logic 304 has an input connected to current mode register 302, and input connected to command queue 220, an input and output connected to final arbiter 350, and an input and output connected to page hit arbiter 310, page conflict arbiter 320, and page miss arbiter 330.

In operation, arbiter 238 selects memory access commands from command queue 220 and refresh control logic 232 by taking into account the current mode (indicating whether a read streak or write streak is in progress), the page status of each entry, the priority of each memory access request, and the dependencies between requests. The priority is related to the quality of service or QoS of requests received from the AXI4 bus and stored in command queue 220, but can be altered based on the type of memory access and the dynamic operation of arbiter 238. Arbiter 238 includes three sub-arbiters that operate in parallel to address the mismatch between the processing and transmission limits of existing integrated circuit technology. The winners of the respective sub-arbitrations are presented to final arbiter 350. Final arbiter 350 selects between these three sub-arbitration winners as well as a refresh operation from refresh control logic 232, and may further modify a read or write command into a read or write with auto-precharge command as determined by page close predictor 362.

Cross-mode enable logic 304 operates to cause streaks of read commands and streaks of write commands over the memory channel. During a current streak of either type of commands, cross-mode enable logic 304 monitors an indicator of data bus efficiency of the memory channel as further described below with respect to FIG. 4 and FIG. 5. In response to the indicator of data bus efficiency indicating that data bus efficiency is less than a designated threshold, cross-mode enable logic 304 stops the current streak, starts a streak of the other type, and changes the current mode in current mode register 302.

Each of page hit arbiter 312, page conflict arbiter 322, and page miss arbiter 332 has an input connected to the output of timing block 234 to determine timing eligibility of commands in command queue 220 that fall into these respective categories. Timing block 234 includes an array of binary counters that count durations related to the particular operations for each bank in each rank. The number of timers needed to determine the status depends on the timing parameter, the number of banks for the given memory type, and the number of ranks supported by the system on a given memory channel. The number of timing parameters that are implemented in turn depends on the type of memory implemented in the system. For example, GDDR5 memories require more timers to comply with more timing parameters than other DDRx memory types. By including an array of generic timers implemented as binary counters, timing block 234 can be scaled and reused for different memory types. The inputs from cross-mode enable logic 304 signal the sub-arbiters which type of commands, read or write, to provide as candidates for final arbiter 350.

A page hit is a read or write cycle to an open page. Page hit arbiter 312 arbitrates between accesses in command queue 220 to open pages. The timing eligibility parameters tracked by timers in timing block 234 and checked by page hit arbiter 312 include, for example, row address strobe (RAS) to column address strobe (CAS) delay time ($t_{RCD}$) and CAS latency ($t_{CL}$). For example, $t_{RCD}$ specifies the minimum amount of time that must elapse before a read or write access to a page after it has been opened in a RAS cycle. Page hit arbiter 312 selects a sub-arbitration winner based on the assigned priority of the accesses. In one embodiment, the priority is a 4-bit, one-hot value that therefore indicates a priority among four values, however it should be apparent that this four-level priority scheme is just one example. If page hit arbiter 312 detects two or more requests at the same priority level, then the oldest entry wins.

A page conflict is an access to one row in a bank when another row in the bank is currently activated. Page conflict arbiter 322 arbitrates between accesses in command queue 220 to pages that conflict with the page that is currently open in the corresponding bank and rank. Page conflict arbiter 322 selects a sub-arbitration winner that causes the issuance of a precharge command. The timing eligibility parameters tracked by timers in timing block 234 and checked by page conflict arbiter 322 include, for example, active to precharge command period ($t_{RAS}$). Page conflict arbiter 322 selects a sub-arbitration winner based on the assigned priority of the access. If page conflict arbiter 322 detects two or more requests at the same priority level, then the oldest entry wins.

A page miss is an access to a bank that is in the precharged state. Page miss arbiter 332 arbitrates between accesses in command queue 220 to precharged memory banks. The timing eligibility parameters tracked by timers in timing block 234 and checked by page miss arbiter 332 include, for example, precharge command period ($t_{RP}$). If there are two or more requests that are page misses at the same priority level, then the oldest entry wins.

Each sub-arbiter outputs a priority value for their respective sub-arbitration winner. Final arbiter 350 compares the priority values of the sub-arbitration winners from each of page hit arbiter 312, page conflict arbiter 322, and page miss arbiter 332. Final arbiter 350 determines the relative priority among the sub-arbitration winners by performing a set of relative priority comparisons taking into account two sub-arbitration winners at a time. The sub-arbiters may include a set of logic for arbitrating commands for each mode, read and write, so that when the current mode changes, a set of available candidate commands are quickly available as sub-arbitration winners.

After determining the relative priority among the three sub-arbitration winners, final arbiter 350 then determines whether the sub-arbitration winners conflict (i.e. whether they are directed to the same bank and rank). When there are no such conflicts, then final arbiter 350 selects up to two sub-arbitration winners with the highest priorities. When there are conflicts, then final arbiter 350 complies with the following rules. When the priority value of the sub-arbitration winner of page hit arbiter 312 is higher than that of page conflict arbiter 322, and they are both to the same bank and rank, then final arbiter 350 selects the access indicated by page hit arbiter 312. When the priority value of the sub-arbitration winner of page conflict arbiter 322 is higher than that of page hit arbiter 312, and they are both to the same bank and rank, final arbiter 350 selects the winner based on several additional factors. In some cases, page close predictor 362 causes the page to close at the end of the access indicated by page hit arbiter 312 by setting the auto precharge attribute.

Within page hit arbiter 312, priority is initially set by the request priority from the memory accessing agent but is adjusted dynamically based on the type of accesses (read or write) and the sequence of accesses. In general, page hit arbiter 312 assigns a higher implicit priority to reads, but implements a priority elevation mechanism to ensure that writes make progress toward completion.

Whenever page hit arbiter 312 selects a read or write command, page close predictor 362 determines whether to send the command with the auto-precharge (AP) attribute or not. During a read or write cycle, the auto-precharge attribute is set with a predefined address bit and the auto-precharge attribute causes the DDR device to close the page after the read or write cycle is complete, which avoids the need for the memory controller to later send a separate precharge command for that bank. Page close predictor 362 takes into account other requests already present in command queue 220 that access the same bank as the selected command. If page close predictor 362 converts a memory access into an AP command, the next access to that page will be a page miss.

By using different sub-arbiters for different memory access types, each arbiter can be implemented with simpler logic than if it were required to arbitrate between all access types (page hits, page misses, and page conflicts; although embodiments including a single arbiter are envisioned).

Thus the arbitration logic can be simplified and the size of arbiter 238 can be kept relatively small.

In other embodiments, arbiter 238 could include a different number of sub-arbiters. In yet other embodiments, arbiter 238 could include two or more sub-arbiters of a particular type. For example, arbiter 238 could include two or more page hit arbiters, two or more page conflict arbiters, and/or two or more page miss arbiters.

Figure 4:
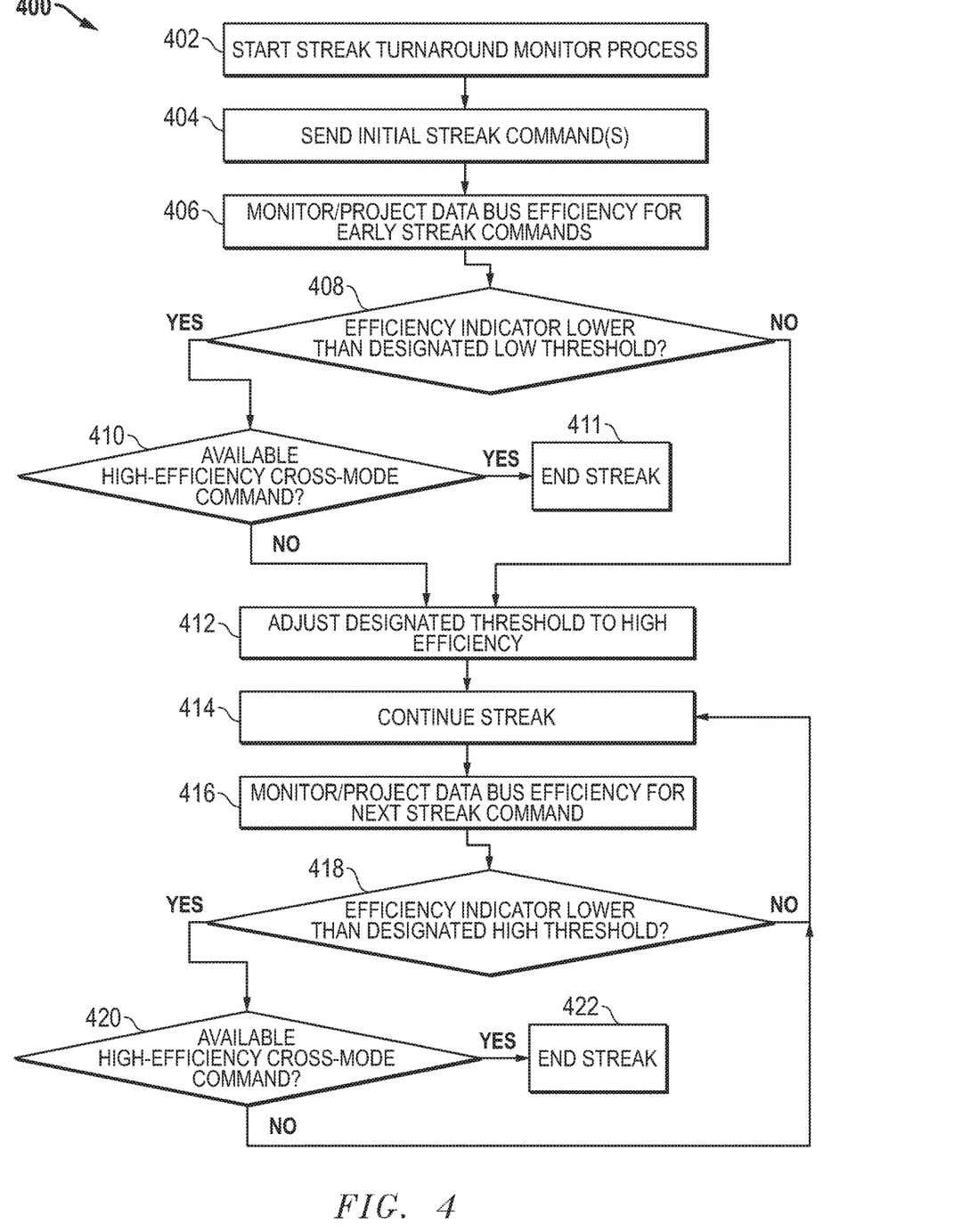
FIG. 4 is a flow diagram of a process for managing streak efficiency according to some embodiments.

FIG. 4 is a flow diagram 400 of a process for managing streak efficiency according to some embodiments. In some versions, the process is embodied in monitoring logic circuitry inside the memory controller's arbiter (such as arbiter 238, FIG. 2). In other versions, the process may be performed by digital logic or a controller having similar functionality while using different methods of arbitration than the sub-arbiters 305 and final arbiter 350 described above. The process generally works to decide when to perform a turnaround of the streak process, changing the current mode to read from write, or to write from read to improve data bus utilization efficiency. The process may be used in combination with other techniques of determining the length of a streak of read or write commands.

The process starts at block 402, at the beginning of each streak of commands, and monitors the streak of commands until the process decides to make a turnaround and change the current mode to start a new streak. At block 404, one or more initial commands at the beginning of the streak are sent by the arbiter according to a suitable command arbitration process. The data bus efficiency is monitored or projected for the initial commands at block 406. In some embodiments, an indicator of data bus efficiency is calculated as a rolling calculation of data bus utilization. In other embodiments, other indicators are used as further described below. At block 408, the process checks if the indicator of data bus efficiency is lower than a designated low-efficiency threshold. This low-efficiency indicator is used at the beginning of the streak because the initial few commands of a streak do not produce efficiency changes until the data has passed over the data bus. As the streak continues, the efficiency is expected to change rapidly to a high efficiency if a series of efficient commands are available.

If the efficiency indicator is not lower than the designated low-efficiency threshold at block 408, the process goes to block 412. If it is lower, the process goes to block 410 where it checks if there is an available cross-mode command with a high efficiency. Block 410 may include calculating a projected efficiency for candidate commands at the arbiter. Generally the calculated efficiency indicator is compared to a designated threshold to determine if the cross-mode command is high efficiency. The threshold to which the calculated efficiency indicator is compared, in some embodiments, is based on at least partially the time it takes to turnaround the process to start a new streak. In some embodiments, the efficiency indicator is calculated as a "cost" indicator, in which a high cost indicates inefficiency and a low cost indicates an efficient command. If there is an available cross-mode high-efficiency command at block 410, the process goes to block 411 where it ends the current streak and starts a streak of the other type. If not, the process goes to block 412 where the current streak is continued.

At block 412, the efficiency threshold is raised to a high efficiency level. This higher level is selected to reflect the high efficiency expected after a streak is past initial inefficiencies and has achieved the high efficiency that often occurs in early-middle of streaks. With the efficiency threshold adjusted, the process continues the streak at block 414 by sending the next command in the streak. The data bus efficiency continues to be monitored for each command as shown at block 416, by calculating an efficiency indicator which is employed to either monitor or project the data bus efficiency that results or will result from sending the command.

At block 418, if the efficiency indicator is lower than the high efficiency threshold, it may be advantageous to end the current streak. The process goes to block 420 where it checks if a high-efficiency cross-mode command is available. If so, the process goes to block 422 where it ends the current streak and starts a streak of the other type. If no high-efficiency cross-mode command is available, the process goes to block 414 where it continues the current streak.

While in this embodiment a low efficiency threshold is adjusted to a high efficiency threshold (block 412), in other embodiments the efficiency threshold is adjusted after each command sent in the streak. In such case, the efficiency threshold is updated at block 416 before calculating the efficiency indicator value. In some embodiments, a counter is employed to track the length of the current streak, and the efficiency threshold is adjusted to require a higher efficiency after each command sent based on the value of the counter.

Figure 5:
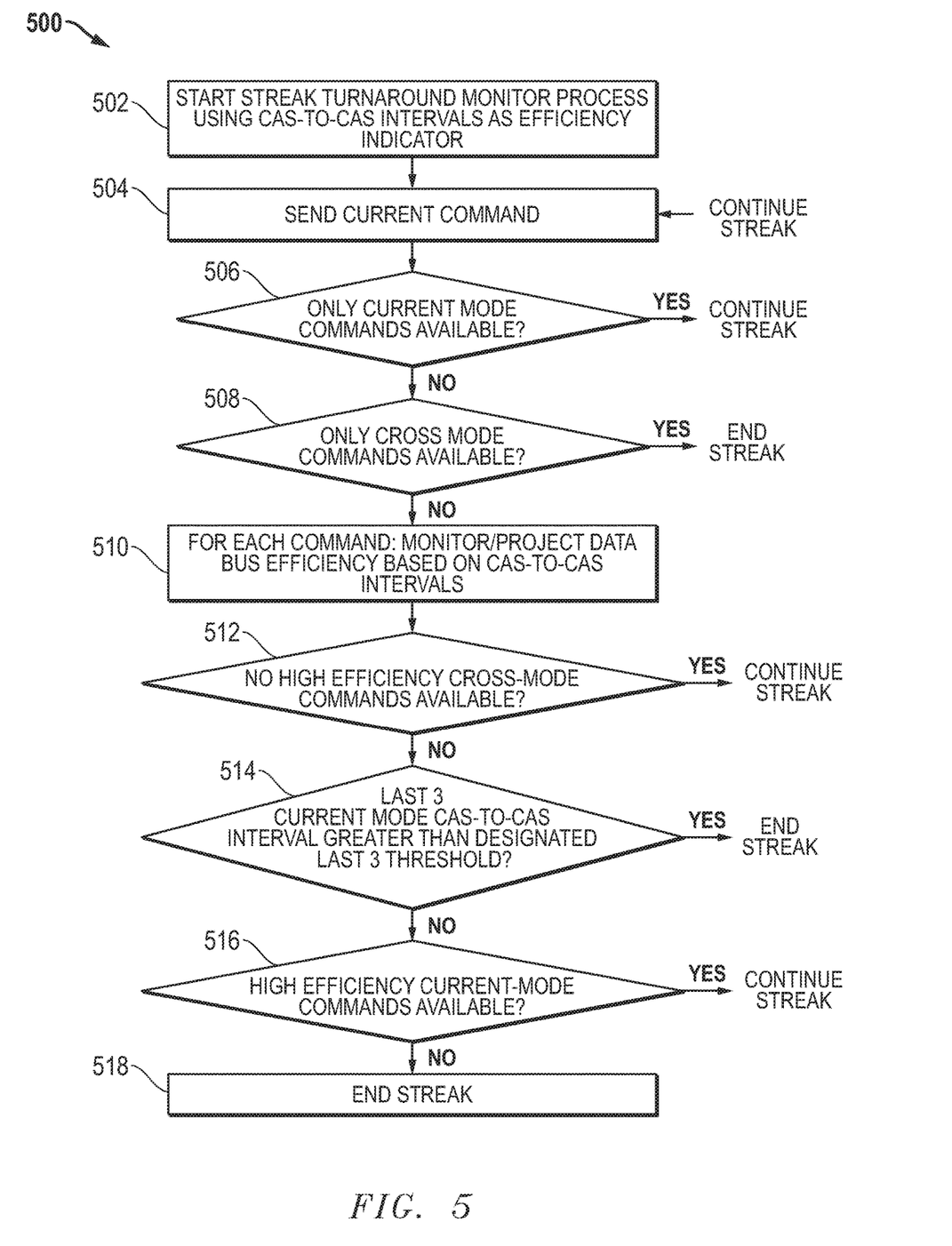
FIG. 5 is a flow diagram of another process for managing streak efficiency according to some additional embodiments.

FIG. 5 is a flow diagram 500 of a process for managing streak efficiency according to some additional embodiments. The process is used each time a streak begins to monitor the streak efficiency, and is typically performed by monitoring logic inside the memory controller's arbiter (such as arbiter 238, FIG. 2). The depicted process employs an interval between two or more adjacent column-address-strobe (CAS) commands as an indicator of data bus efficiency, and is repeated for each command sent in the streak until the process decides to "turnaround" and end the streak.

When a new streak begins, the process at block 502 starts the turnaround monitor process. At block 504, the initial command of the streak is sent over the command bus. After the command is sent, the process performs several checks to determine if the streak should end or continue. At block 506, the process determines whether only current mode commands are available to be sent at the arbiter. For example, if the current streak is a write streak, block 506 determines whether only write commands are pending. If so, the process continues the streak, returning to block 504. Next at block 508, the process determines if only cross-mode commands are available at the arbiter. If so, the process ends the current streak and begins a new streak. If not, the process continues to block 510, where it monitors or projects the data bus efficiency for each command based on interval between CAS commands, referred to as "CAS-to-CAS" interval.

Block 510 calculates an indicator of data bus efficiency for at least one command. In some embodiments, the indicator is calculated for many candidate commands at the arbiter. The indicator of data bus efficiency includes a measurement or projection of one or more time intervals between column-address-strobe (CAS) commands. For example, in one embodiment, the indicator of data bus efficiency includes a time interval between a most recently transmitted CAS command and a time at which a selected subsequent CAS command can be transmitted. This calculation yields a projection of the data bus efficiency of the respective candidate command. Other embodiments include more than one CAS-to-CAS interval in the calculation. Typically the interval is measured in clock cycles.

At block 512, the process determines whether any cross-mode commands available as candidates have a high efficiency based on the indicator calculated at block 510. If there are no high-efficiency cross-mode commands available, the process continues the current streak. This conditional check has the advantage of preventing a sequence in which a turnaround is conducted, and then no high efficiency commands are available in the other mode and the process turns around again repeatedly. Generally the calculated efficiency indicator is compared to a designated threshold to determine if the cross-mode command is high efficiency. If the indicator is the CAS-to-CAS interval calculated directly in clock cycles, this indicator may be treated as a cost function in which low cost signals high efficiency. The threshold to which the value is compared, in some embodiments, is based on at least partially the time it takes to turnaround the process to start a new streak.

If there are high-efficiency cross-mode commands available at block 512, the process goes to block 514, where it uses another type of efficiency indicator to prevent a continuing sequence of commands that are just slightly within the high efficiency threshold but overall provide an inefficient streak. Block 514 calculates a "last 3" current mode CAS-to-CAS interval, which provides the interval between the most recently transmitted CAS command, and a prior CAS command occurring three CAS commands ago. If this "last 3" interval is greater than a designated threshold, the process ends the current streak and performs a turnaround.

If the "last 3" interval is within the designated threshold, the process at block 514 goes to block 516. At block 516, it checks whether there are high-efficiency commands available for the current mode. If so, the process continues the current streak. If not, the process goes to block 518 where it ends the current streak. Ending the streak in each depicted case causes a turnaround process in which a streak of the other mode is begun. The turnaround includes clearing in-process tags for the cross mode (former current mode) and clears a wait-in-progress tag for the new current mode. Continuing the streak includes arbiter 238 selecting the next command for sending at block 504.

While the process in this embodiment employs several different determinations in deciding whether to end the current streak, other embodiments may include fewer than all of the depicted conditional checks.

Figure 6:
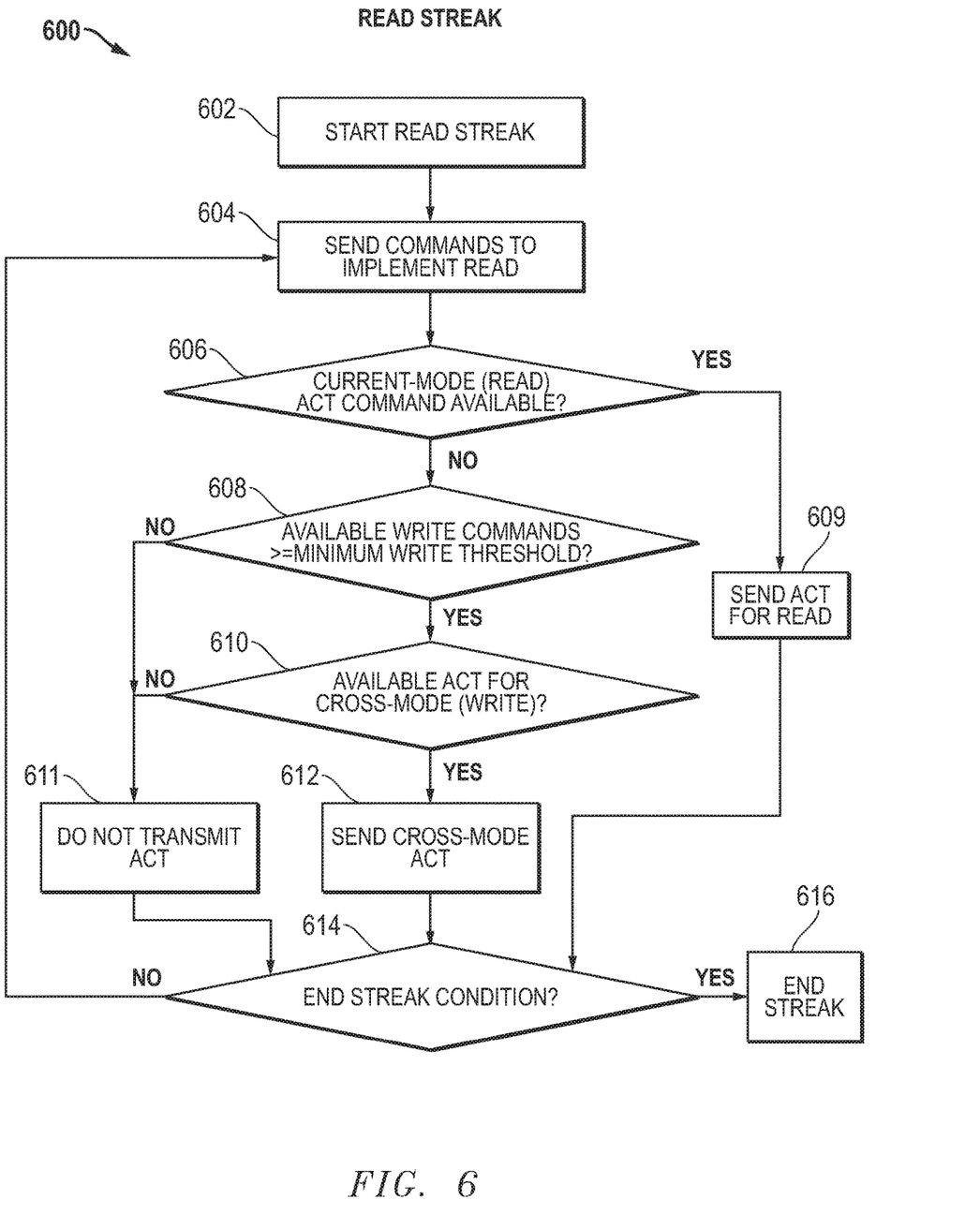
FIG. 6 is a flow diagram of a process for performing cross-mode activate commands according to some embodiments.

FIG. 6 is a flow diagram 600 of a process for performing cross-mode activate commands according to some embodiments. In this embodiment, the depicted process is performed at an arbiter by cross-mode enable logic such as logic 304 of FIG. 3. In some embodiments, the depicted process is employed together with efficiency monitoring techniques such as those of FIG. 4 or FIG. 5. Generally, the process improves the efficiency of command streaks by allowing row activate (ACT) commands from the cross-mode to occur toward the end of a streak of current-mode commands, in order to hide page open latency of a page miss/conflict request for the cross mode.

At block 602, the process starts a streak of consecutive read commands to be transacted over a memory channel with a DRAM. At block 604, the process sends commands to the DRAM that together constitute a read command. Following certain selected commands, the command bus has available times in which ACT commands may be transmitted to perform row activates for read or write commands. The process needs to select from among ACT commands available at the arbiter to be sent in order to fill the available times and make efficient use of the command bus.

At block 606, the process checks if there are ACT commands available associated with the current mode commands, in this case read commands. If so, the process goes to block 609 where it sends a selected one of the ACT commands for a read command. If not, the process goes to block 608, where it checks if available write commands, which are currently the cross mode, are greater than or equal to a designated minimum threshold. If so, the process is allowed to send cross-mode ACT commands, and block 610 checks whether there are available ACT commands associated with write commands. If so, a cross-mode ACT command is selected and sent at block 612. If no cross-mode ACT is available at block 610, the process goes to block 611 where it does not transmit an ACT for the command bus timeslot under consideration.

After an ACT of either type is sent at blocks 609 or 612, or the ACT is skipped at block 611, the process goes to block 614 where it checks for an end streak condition. The particular conditions that will cause a streak to end varies in different embodiments. For example, the process of FIG. 4 or FIG. 5 may be used, or other processes may be used. In an example alternative embodiment, the length of a streak is determined by a snapshot, or count, of how many commands are available to be used in the streak at the start of the streak. Such a snapshot is often a good indicator of how long a streak can be and remain efficient. In such case, the end of streak condition at block 614 would be the size of the streak was equal to the count made of available commands the time the streak began (the snapshot). In response to an end streak condition at block 614, the process goes to block 616 where it ends the current streak, swaps the current mode and the cross mode, and begins transacting the cross-mode commands including any cross-mode command for which an ACT command was sent at block 612. If no end streak condition is found at block 614, the process returns to block 604 to where it continues the current streak sending read commands.

Figure 7:
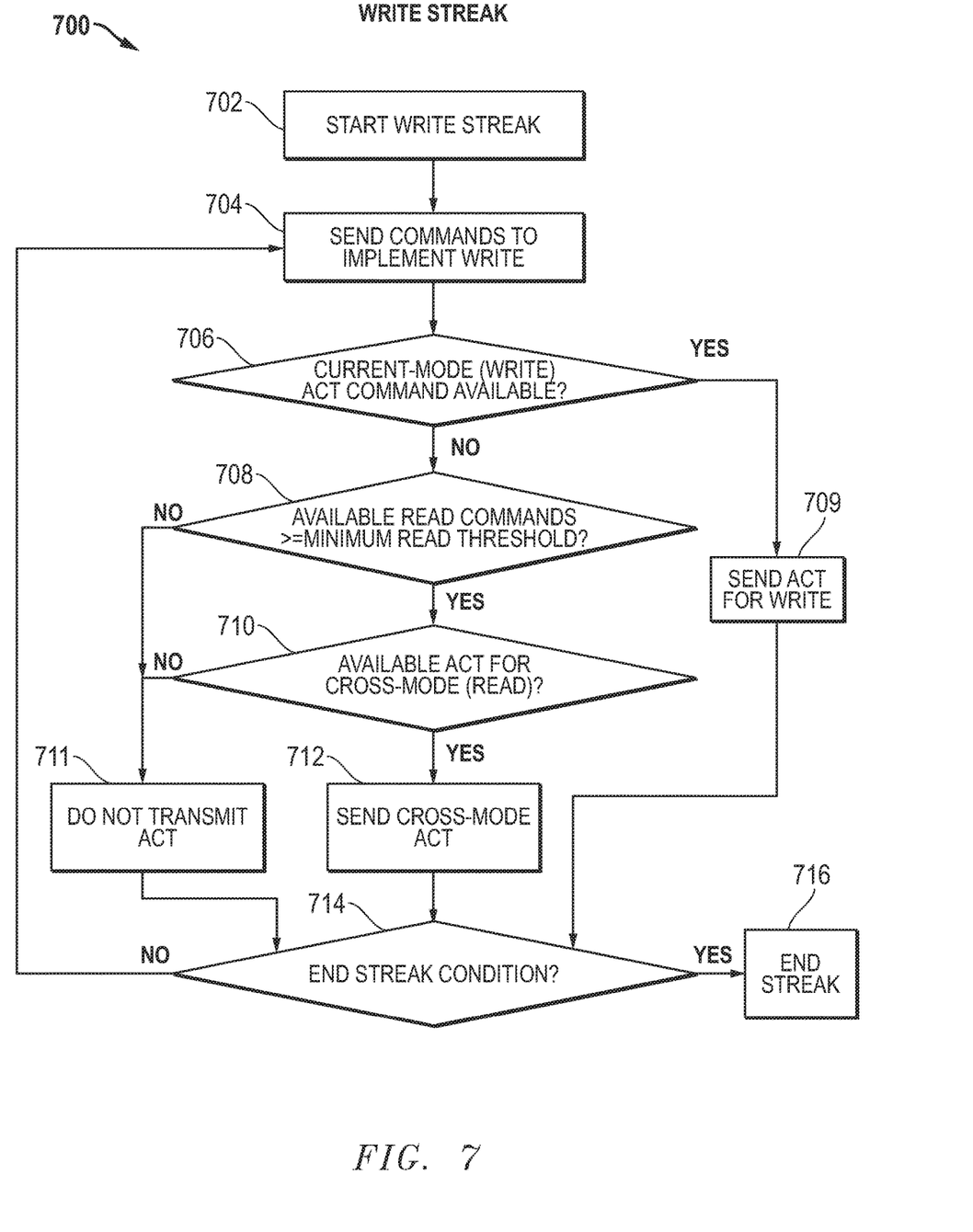
FIG. 7 is a flow diagram of another process for performing cross-mode activate commands according to some embodiments.

FIG. 7 is a flow diagram 700 of another process for performing cross-mode activate commands according to some embodiments. The depicted process is similar to the process of FIG. 6, except it depicts a streak of write commands rather than read commands. At block 702, the process starts a streak of consecutive write commands to be transacted over a memory channel to a DRAM. This typically accompanies an end of a previous streak such as that at block 616 (FIG. 6). At block 704, the process sends low level commands to the DRAM to implement a write command.

When an available slot arises for an ACT command, the process needs to select from among ACT commands available at the arbiter to be sent. At block 706, the process checks if there are ACT commands available associated with the current mode commands (write commands). If so, the process goes to block 709 where it sends a selected one of the ACT commands for a write command. If not, the process goes to block 708, where it checks if available read commands, which are currently the cross mode, are greater than or equal to a designated minimum threshold. If so, the process is allowed to send cross-mode ACT commands, and block 710 checks whether there are available ACT commands associated with write commands. The designated minimum threshold is a read threshold when read commands are the cross mode, and a write threshold different from the read threshold when write commands are the cross mode (FIG. 6). The read threshold is preferably lower than the write threshold.

If cross-mode ACT commands are available at block 710, a cross-mode ACT command is selected and sent at block 712. If no cross-mode ACT is available at block 710, the process goes to block 711 where it does not transmit an ACT for the command bus timeslot under consideration.

After an ACT of either type is sent at blocks 709 or 712, or the ACT is skipped at block 711, the process goes to block 714 where it checks for an end streak condition. In response to an end streak condition at block 714, the process goes to block 616 where it ends the current streak, swaps the current mode and the cross mode, and begins transacting the cross-mode commands including any cross-mode command for which an ACT command was sent at block 712. If no end streak condition is found at block 714, the process returns to block 704 to where it continues the current streak sending read commands.

Memory controller 200 of FIG. 2 or any portions thereof, such as arbiter 238 and refresh control logic 232, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory channel controller 210 and/or power engine 250 may vary in different embodiments. Memory controller 200 may interface to other types of memory besides DDRx, such as high bandwidth memory (HBM), RAMbus DRAM (RDRAM), and the like. While the illustrated embodiment showed each rank of memory corresponding to separate DIMMs or SIMMs, in other embodiments each module can support multiple ranks. Still other embodiments may include other types of DRAM modules or DRAMs not contained in a particular module, such as DRAMs mounted to the host motherboard. Accordingly, it is intended by the appended claims to cover all modifications of the disclosed embodiments that fall within the scope of the disclosed embodiments.

What is claimed is:

1. A memory controller, comprising:
a command queue having a first input for receiving memory access requests;
an arbiter coupled to the command queue for selecting entries from the command queue, for transmission over a memory channel, the arbiter operable to (a) select streaks of consecutive read commands and streaks of consecutive write commands for transmission over the memory channel, the arbiter having a current mode indicating a type of commands in a current streak, wherein the type indicates one of read and write, and a cross mode indicating the other one of read and write; (b) monitor commands in the command queue for the current mode and the cross mode; (c) in response to designated conditions including an absence of current mode activate (ACT) commands, send one available cross mode activate ACT command for a cross-mode command while continuing to operate in the current mode; and (d) in response to an end streak condition, swap the current mode and the cross mode, and transmit the cross-mode command.

2. The memory controller of claim 1, wherein the designated conditions include a designated minimum threshold of cross-mode commands being available at the arbiter.

3. The memory controller of claim 2, wherein the designated minimum threshold comprises a read threshold when read is the cross mode and a write threshold different from the read threshold when write is the cross mode.

4. The memory controller of claim 3, wherein the read threshold is lower than the write threshold.

5. The memory controller of claim 1, wherein the end streak condition includes a measurement of one or more intervals between column-address-strobe (CAS) commands.

6. The memory controller of claim 5, wherein the end streak condition includes an interval between a most recently transmitted CAS command and a time at which a selected subsequent CAS command can be transmitted.

7. The memory controller of claim 1, wherein the end streak condition includes a number of current mode commands sent being equal to a snapshot of the number of current mode commands available at the arbiter at a beginning of the streak.

8. A method, comprising:
causing streaks of consecutive read commands and streaks of consecutive write commands to be transmitted over a memory channel, the streaks based on a current mode indicating a type of commands in a current streak, wherein the type indicates one of read or write, and a cross mode indicating the other one read and write;
monitoring available commands for the current mode and the cross mode;
in response to designated conditions including an absence of current mode activate (ACT) commands, sending an available cross-mode ACT command for a cross-mode command to a memory interface queue while continuing to operate in the current mode; and
in response to an end streak condition, swapping the current mode and the cross mode, and transacting the cross-mode command.

9. The method of claim 8, further comprising:
receiving a plurality of memory access requests including memory reads and memory writes; and
selectively placing memory access commands for fulfilling the memory access requests in a memory interface queue and transmitting the memory access commands from the memory interface queue to a memory channel coupled to at least one dynamic random access memory (DRAM).

10. The method of claim 8, wherein the designated conditions include a designated minimum threshold of cross-mode commands being available to transmit.

11. The method of claim 10, wherein the designated minimum threshold comprises a read threshold when read is the cross mode and a write threshold different from the read threshold when write is the cross mode.

12. The method of claim 11, wherein the read threshold is lower than the write threshold.

13. The method of claim 8, wherein the end streak condition includes a measurement of one or more intervals between column-address-strobe (CAS) commands.

14. The method of claim 13 wherein the end streak condition includes an interval between a most recently transmitted CAS command and an earliest time at which a selected subsequent CAS command can be transmitted.

15. The method of claim 8, wherein the end streak condition includes a number of current mode commands sent being equal to a snapshot of the number of current mode commands available at a beginning of the streak.

16. A data processing system, comprising:
a central processing unit;
a data fabric coupled to the central processing unit; and
a memory controller coupled to the data fabric for fulfilling memory requests from the central processing unit, the memory controller comprising:
a command queue having a first input for receiving memory access requests;
an arbiter coupled to the command queue for selecting entries from the command queue for transmission over a memory channel, the arbiter operable to (a) select streaks of consecutive read commands and streaks of consecutive write commands for transmission over the memory channel, the arbiter having a current mode indicating a type of commands in a current streak, wherein the type indicates one of read and write, and a cross mode indicating the other one of read and write; (b) monitor commands in the command queue for the current mode and the cross mode; (c) in response to designated conditions including an absence of current mode activate (ACT) commands, send one available cross mode command while continuing to operate in the current mode; and (d) in response to an end streak condition, swap the current mode and the cross mode, and transmit a cross-mode command.

17. The data processing system of claim 16, wherein the designated conditions include a designated minimum threshold of cross-mode commands being available at the arbiter.

18. The data processing system of claim 17, wherein the designated minimum threshold comprises a read threshold when read is the cross mode and a write threshold different from the read threshold when write is the cross mode.

19. The data processing system of claim 18, wherein the read threshold is lower than the write threshold.

20. The data processing system of claim 16, wherein the end streak condition includes a measurement of one or more intervals between column-address-strobe (CAS) commands.

21. The data processing system of claim 20, wherein the end streak condition includes an interval between a most recently transmitted CAS command and a time at which a selected subsequent CAS command can be transmitted.

22. The data processing system of claim 16, wherein the end streak condition includes a number of current mode commands sent being equal to a snapshot of the number of current mode commands available at the arbiter at a beginning of the streak.

23. The data processing system of claim 16, wherein the cross-mode command sent in response to the designated conditions is a cross-mode ACT command.

24. A memory controller, comprising:
a command queue having a first input for receiving memory access requests; and
an arbiter coupled to the command queue for selecting entries from the command queue the arbiter operable to (a) select streaks of consecutive read commands and streaks of consecutive write commands for transmission over a memory channel, the arbiter having a current mode indicating a type of commands in a current streak, wherein the type indicates one of read and write, and a cross mode indicating the other one of read and write; (b) monitor commands in the command queue for the current mode and the cross mode; (c) in response to designated conditions including an absence of available current mode activate (ACT) commands, send at least one ACT command for a cross-mode command while continuing to operate in the current mode; and (d) in response to an end streak condition, swap the current mode and the cross mode, and transact the cross-mode command.

25. The memory controller of claim 24, wherein the designated conditions include a designated minimum threshold of cross-mode commands being available at the arbiter.

* * * * *